United States Patent [19]

Fuhrmann et al.

[11] 4,197,711

[45] Apr. 15, 1980

[54] EXHAUST DRIVEN TURBOCHARGER FOR AN INTERNAL COMBUSTION ENGINE

[75] Inventors: Ernest Fuhrmann, Maichingen, Austria; Ulrich Lehmann, Weissach, Fed. Rep. of Germany

[73] Assignee: Dr. Ing. h. c. F. Porsche Aktiengesellschaft, Fed. Rep. of Germany

[21] Appl. No.: 845,531

[22] Filed: Oct. 26, 1977

[30] Foreign Application Priority Data

Oct. 30, 1976 [DE] Fed. Rep. of Germany ....... 2650033

[51] Int. Cl.² ............................................. F02B 37/00
[52] U.S. Cl. ...................................................... 60/602
[58] Field of Search ................. 60/600, 601, 602, 603, 60/605, 614, 615; 123/119 C

[56] References Cited

U.S. PATENT DOCUMENTS

| | | | |
|---|---|---|---|
| 3,925,989 | 12/1975 | Pustelnik | 60/602 |
| 3,941,104 | 3/1976 | Egli | 60/600 X |
| 4,044,560 | 8/1977 | Dorsch et al. | 60/601 |

*Primary Examiner*—Michael Koczo
*Attorney, Agent, or Firm*—Craig and Antonelli

[57] ABSTRACT

Turbocharging apparatus for an internal combustion engine is provided which includes an exhaust gas driven turbocharger with an exhaust gas line leading to an exhaust turbine thereof to drive the same. In order to control the supply of exhaust gases to the exhaust turbine, a control valve is provided between the exhaust line and atmosphere for selectively venting a portion of the exhaust gases. The position of the control valve is in turn governed by a movable diaphragm communicated with charging air pressure by way of a regulating device, which regulating device is responsive to both the charging air pressure and the temperature of the cylinder head of the engine, to precisely control the turbocharger. In one preferred embodiment, the temperature responsive control includes a servomotor arranged in a circuit with a temperature dependent resistance, a difference-amplifier, and a potentiometer, which servomotor controls valving apparatus communicating charging air pressure to the control valve at the exhaust line. In another preferred embodiment, a temperature dependent resistance is provided which is connected with an electronic stepped circuit control device for controlling the supply of charging air pressure to chambers of a control device for the valve in the exhaust line.

10 Claims, 5 Drawing Figures

EXHAUST DRIVEN TURBOCHARGER FOR AN INTERNAL COMBUSTION ENGINE

BACKGROUND AND SUMMARY OF THE INVENTION

The invention relates to a device for the regulation of the charging air pressure for an internal combustion engine provided with an exhaust gas driven turbocharger. The exhaust gas driven turbocharger of the type contemplated includes an exhaust gas driven turbine and a charging air blower. The invention more specifically relates to a regulating device responding to the charging air pressure of the charging air blower for operating a control device arranged in an exhaust canal bypassing the exhaust gas driven turbine.

With internal combustion engines operating with exhaust turbocharging, it is known (DT-OS 1751 061) to limit the charging air pressure to avoid overloading the internal combustion engine and the charging air blower. Thus, charging air is discharged into the atmosphere at a predetermined charging air overpressure by means of a spring-loaded valve arranged in the charging air line whereby a too-high charging air pressure in the charging air line ahead of the output regulating member of the internal combustion engine is avoided at all operating ranges thereof.

In addition, a device is known for the manual regulation of the charging air pressure for internal combustion engines operating with exhaust charging (DT-OS 2 362 133), in which the device for the regulation of the charging air pressure acts together with the charging air pressure in the charging air line of the charging blower and which regulates the quantity of exhaust admitted to the exhaust turbine.

However, with both above-mentioned devices, it is disadvantageous that the temperature of the internal combustion engine is not taken into account.

An object of the invention is to provide a device for the regulation of the charging air pressure for an internal combustion engine provided with an exhaust gas driven turbocharger through which the variable temperature ranges of the internal combustion engine are taken into account.

According to an important feature of the invention, the regulating device for the supply of exhaust gases to the turbocharger is influenced by the temperature of the internal combustion engine, preferably by the temperature of the cylinder head. By this means, it is possible under consideration of the temperature of the internal combustion engine, to adjust the regulating device always to the maximum possible charging air pressure. By this means, it is, on the one hand, assured that the internal combustion engine is not damaged as a result of a too high charging pressure and, on the other hand, that with a cold or moderately warm internal combustion engine, it is capable of a higher output than with a warmer internal combustion engine.

Preferred embodiments of the invention comprise a temperature dependent resistance and a servomotor operatively influencable by this resistance, through which the regulating device is adjustable in the sense of an increase or decrease of the maximum charging air pressure. A difference-amplifier is inserted between the temperature-dependent resistance and the servomotor through which a potentiometer (responsive to the position of a portion of the regulating device), arranged at the regulating device, is influenced.

In other preferred embodiments, an electronic-control follows the temperature-dependent resistance by which electromagnetic valves are controlled effecting an adjustment of the regulating device in the sense of an increase or decrease of the maximum charging air pressure. In contrast to the embodiments with a servomotor, these embodiments are distinguished through an unequally higher switch velocity. The electronic-control comprises an integrated switching circuit through which an equal-current valve is digitalized in a certain number of steps (in the preferred embodiment herein, 16 steps utilizing 16 Opto-couplers and 16 driver-transistors are provided).

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
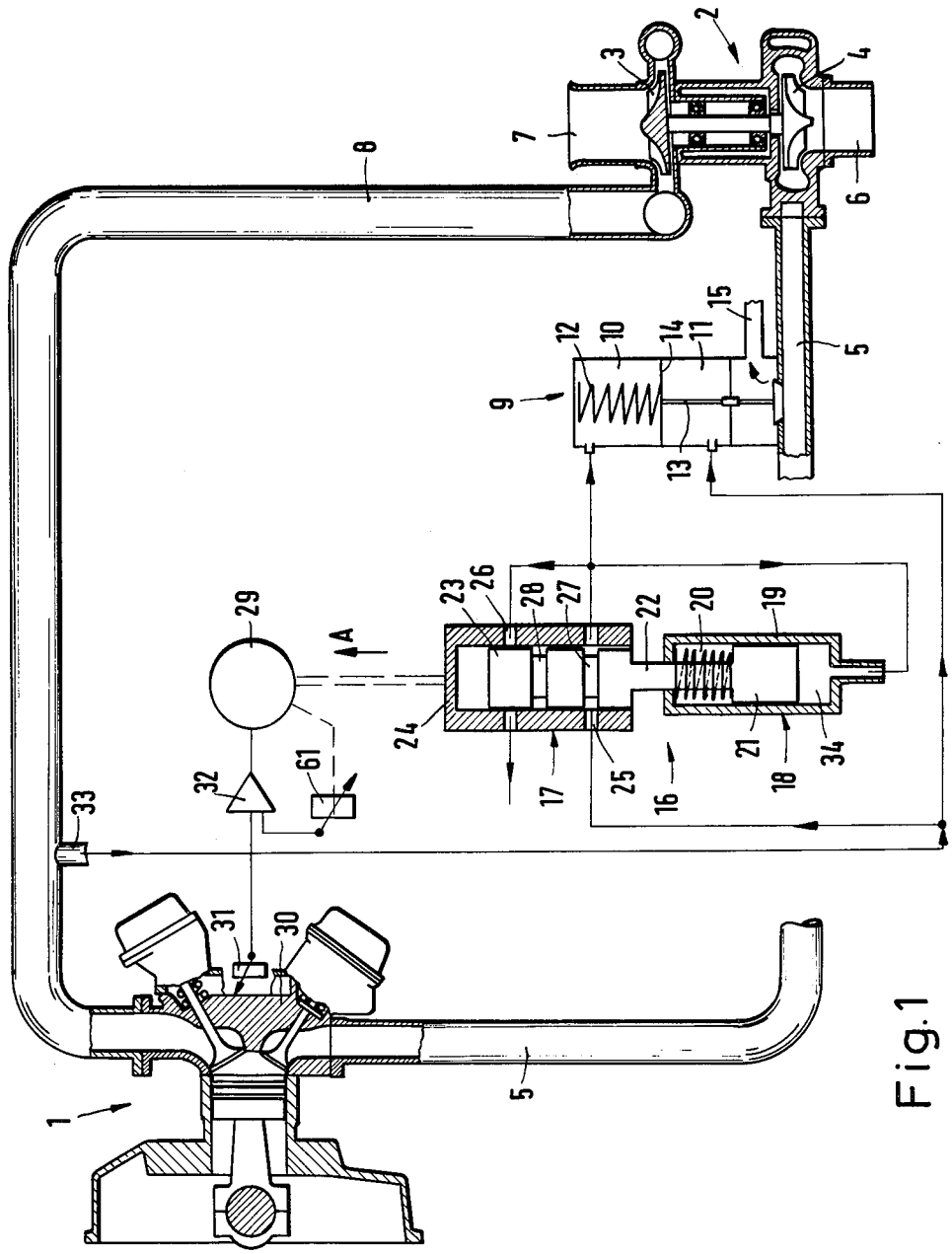
FIG. 1 is a schematic, part sectional view, which shows a device for the regulation of the charging air pressure with mechanical structure constructed in accordance with a preferred embodiment of the present invention, depicted with parts disposed in an engine off position.

In FIG. 1, an internal combustion engine 1 is shown provided with an exhaust gas driven turbocharger 2 which has a charging air blower 3 and an exhaust turbine 4. The exhaust turbine 4 is connected to the internal combustion engine 1 by an exhaust line 5 and an exhaust line 6 is provided for the discharge of the exhaust gas into the atmosphere, or optionally into an afterburning device. The charging air blower 3 is provided with a suction (inlet) pipe 7 and is connected with the internal combustion engine 1 by a charging air line 8.

A control device 9 is provided which comprises two pressure chambers 10 and 11 which are divided by a membrane 14 operatively cooperating with a pressure spring 12 and connected with a valve 13. The exhaust line 5 is provided with an exhaust canal 15, bypassing the exhaust turbine 4 and opening to atmosphere. The valve 13 controls discharge of the exhaust gas through canal 15 into the atmosphere in dependence on the position of valve 13. A regulating device 16 is constructed with a control slide 17 and a pressure gauge 18. The pressure gauge 18 includes a regulating housing 19 in which a regulating plunger 21, cooperating with a pressure spring 20, is slidably arranged. The regulating plunger 21 is solidly conncted with a control plunger 23 by means of a connecting rod which is guided in a control housing 24 and which, together with this forms the control slide 17. The control housing 24 is provided with two cross-bores 25 and 26 arranged at a distance one above the other which cooperate with two circular grooves 27 and 28 at the control plunger 23. Through a servomotor 29, which is influenced by a temperature-dependent resistance 31 and a difference-amplifier 32, arranged at the internal combustion engine preferably in the area of the cylinder head 30 (so that resistance 31 is directly responsive to the temperature of cylinder head 30), the control housing 24 may be adjusted in relation to control plunger 23 in the direction of arrow A, respectively opposite the direction of arrow A. A charging air control line 33 is connected to the charging air line 8 over which, as indicated schematically by arrows, the charging air pressure of the pressure chamber 34 in the pressure gauge 18 is supplied to the pressure chambers 10 and 11 in the control device 9 as well as the cross-bores 25 and 26 of the control housing 24.

Figure 2:
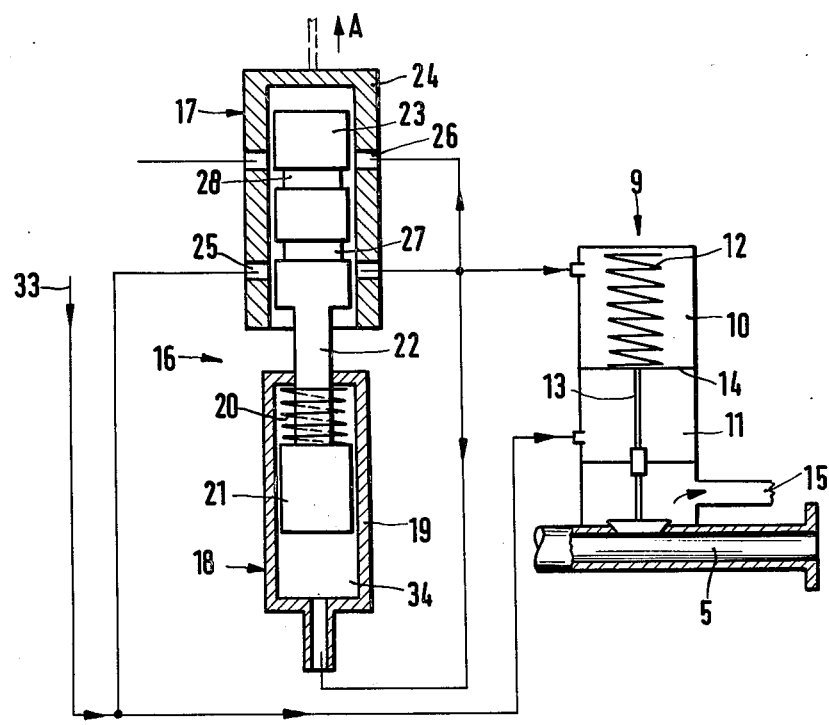
FIG. 2 is a schematic partial view which shows the regulating device of FIG. 1 after the start of the internal combustion engine.

After starting of the internal combustion engine 1, the exhaust turbine 4 and the charging air blower 3, arranged on a common shaft, begin to run. Charging blower 3 supplies fresh air under pressure to the internal combustion engine 1 by way of the charging air line 8. Over the charging air control line 33, charging pressure arrives, at the same time, in the pressure chamber 34 and in the pressure chamber 11, through the cross-bores 25 into the pressure chamber 10 as well as to the cross-bore 26 blocked by the control plunger 23. After arriving at a predetermined maximum charging air pressure of, for example 2 atmospheres with a cold internal combustion engine 1, the pressure spring 20 is compressed, and the regulating plunger 21 and the control plunger 23 are moved into a position shown in FIG. 2. In this position, the cross-bores 25 and 26 are both closed by the control plunger 23 so the charging air pressure is limited to a maximum of 2 atmospheres. This means that the valve 13, at a charging air pressure of over 2 atmospheres, opens (due to cut off of charging air pressure to space 10) and a portion of the exhaust gas is discharged through the exhaust canal 15 into the atmosphere for such a time until the charging air pressure has again decreased to 2 atmospheres.

Figure 3:
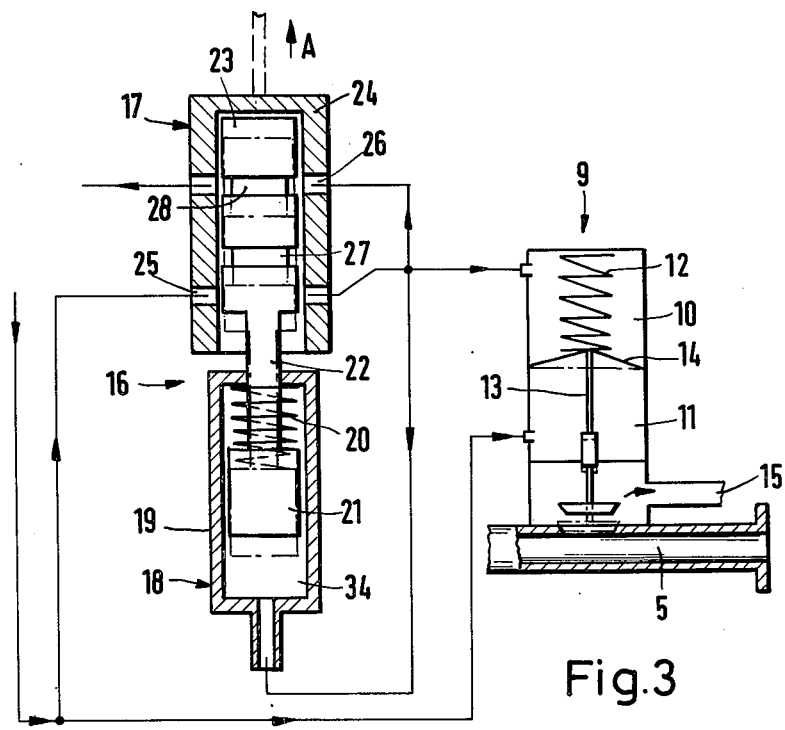
FIG. 3 is a schematic partial view which shows the regulating device of FIG. 1 during the temperature-dependent decrease of the charging air pressure.

After reaching a predetermined higher temperature of the internal combustion engine 1, the charging air pressure must be decreased. In dependence on the resistance 31 which adjusts in accordance with the temperature of the cylinder head 30 of the internal combustion engine 1, the servomotor 29 is operated in such a way through the difference-amplifier 32, that the control housing 24 is moved against the direction of arrow A until it reaches the position shown in FIG. 3 opposite the control plunger 23 shown in full lines so that charging air is discharged into the atmosphere through the cross-bores 26. In this position of the control housing 24, the cross-bore 25 is blocked by the control plunger 23. By the discharge of charging air through the cross-bore 26 into the atmosphere, the charging pressure decreases in the pressure chamber 34 of the pressure gauge 18 and in the pressure chamber 10 of the control device 9. The charging pressure decrease in the pressure chamber 10 effects an opening of valve 13 against the spring force of pressure spring 12 inasmuch as the charging pressure in the pressure chamber 11 of the control device 9 remains the same. As a result, a portion of the exhaust gas is discharged into the atmosphere, with bypassing of the exhaust turbine 4 through the exhaust canal 15 and the air quantity supplied by the charging air blower 3 is reduced. At the same time, the regulating plunger 21 and the control plunger 23 are moved against the spring force of the pressure spring 20 (effectively elongating spring 20) as a result of the diminishing charging air pressure in the pressure chamber 34, in a direction opposite the direction of arrow A for so long until the control plunger 23 has reached a position shown in dot-and dashed lines in FIG. 3 in relation to the control housing 24. Cross-bore 26 as well as cross-bore 25 are again closed so that no more charging air is discharged.

If on the basis of open valve 13, the decreasing charging air pressure through the charging air control line 33 has dropped in the pressure chamber 11 to such a level that it, on the basis of the now position of the regulating device 16, has matched the charging air pressure existing in the pressure chamber 10, the valve 13 is again closed by the spring force of the pressure spring 12. The charging air pressure is therefore adjusted at a new, maximum charging air pressure being below 2 atmospheres. The position in each case of the control housing 24 is reported to the servomotor 29 over a potentiometer 61 operatively cooperating with the difference-amplifier 32 and arranged at the control housing 24.

Figure 4:
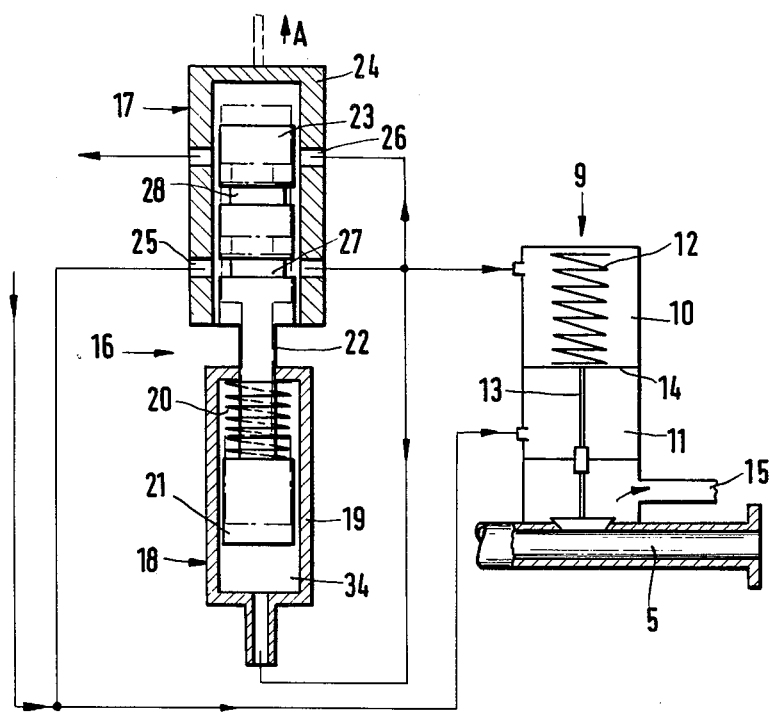
FIG. 4 is a schematic partial view which shows the regulating device of FIG. 1 during the temperature-dependent increase of the charging air pressure.

When the internal combustion engine 1 is operated at a small load for a certain time, the temperature decreases so that the charging air pressure can be increased. Through the resistance 31 adjustable in dependence of the temperature of the cylinder head 30 of the internal combustion engine 1, the difference-amplifier 32 of the servomotor 29 is adjusted such, that the control housing 24 is moved in the direction of arrow A. This movement persists so long until the control housing 24, in relation to control plunger 23 illustrated in full lines, reaches the position shown in FIG. 4. If now the internal combustion engine 1 is operated in a load range in which the charging air pressure increases in relation to the previous maximum charging air pressure, this new charging air pressure arrives, through the charging air control line 33, in the pressure chamber 34 and in the pressure chamber 11, through the cross-bore 25 into the pressure chamber 10 as well as to cross-bore 26, closed by the control plunger 23. By the pressure increase in the pressure chamber 34, the regulating plunger 21 and the control plunger 23 are moved in the direction of arrow A into the position shown in dot-and-dash lines in FIG. 4. In this position, the cross-bore 25 as well as cross-bore 26 are again closed by the control plunger 23 and the regulating device 16 has adjusted itself to a new maximum charging air pressure which is higher than the previous maximum pressure.

Figure 5:
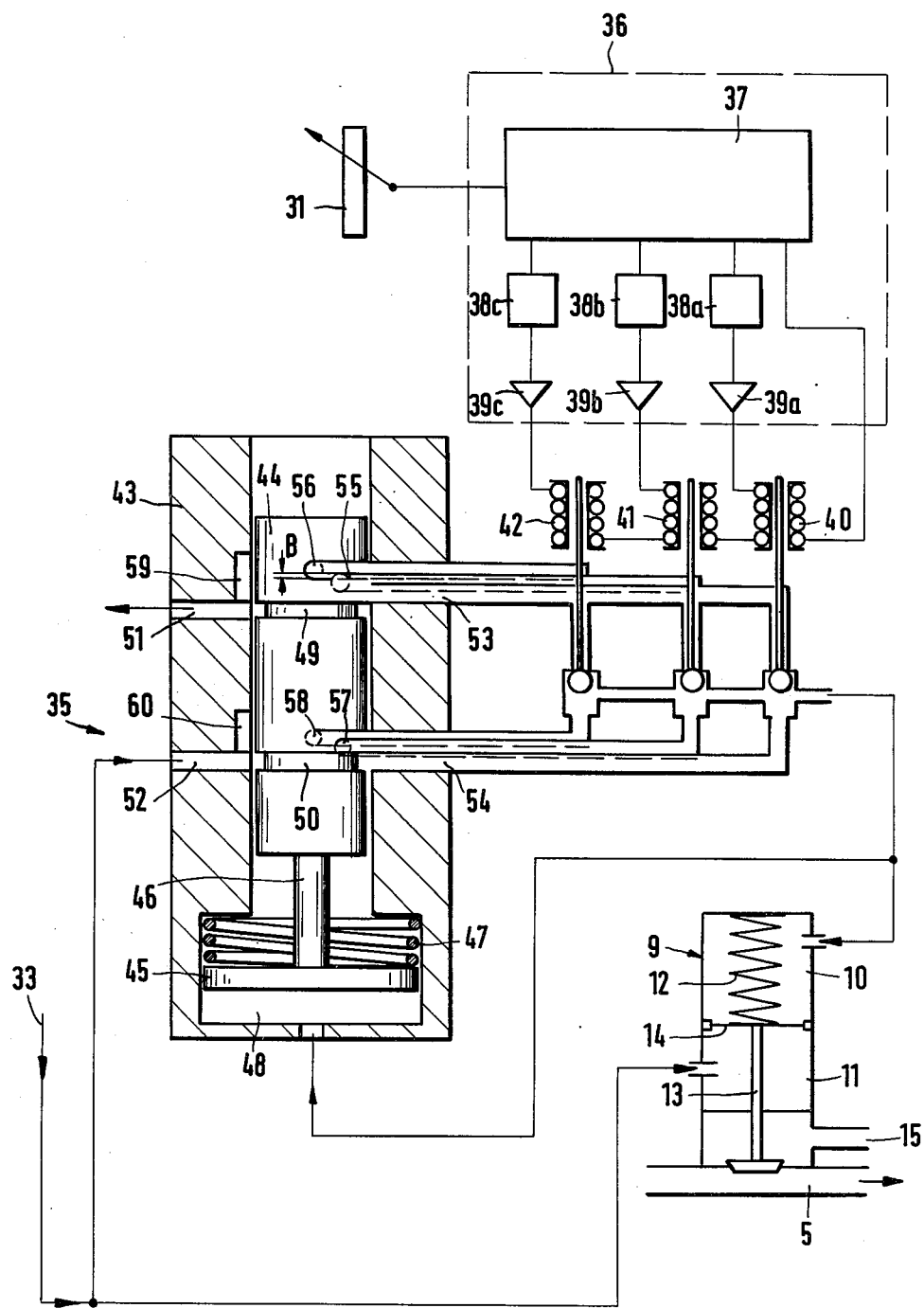
FIG. 5 is a schematic, part sectional view, which shows a device for the regulation of the charging air pressure constructed in accordance with another preferred embodiment of the invention and with electromechanical construction.

In the exemplified embodiments of the invention, shown schematically in FIG. 5, the control device 9 is maintained in its design similar to FIG. 1 whereas the regulating device, designated as 16 in FIG. 1, is constructed differently and is electromagnetically controlled. In FIG. 5, the internal combustion engine 1 and the exhaust turbocharger 2 are not again illustrated since these correspond to the illustration of FIG. 1 and the charging air pressure required for the device of FIG. 5 may be removed from the charging air control line 33 in a manner already described.

An electronic-control device 36, influencing the regulating device 35, follows the temperature-dependent resistance 31. The electronic-control device 36 comprises an integrated circuit 37 by which a direct-current voltage value is digitalized in a preselected arbitrary number of steps (in the present case 16 steps) with 16 Opto-couplers and 16 driving-transistors. For the simplification of the drawing, only three each Opto-couplers and driver-transistors are illustrated whereby the Opto-couplers are designated as 38a, 38b and 38c and the driving-transistors as 39a, 39b and 39c. The Opto-coupler consists, in a known manner, of luminescence-diodes and a transistor influenced (influencable) thereby and the integrated circuit is commercially available and carries the designation UAA 170 (Fachbezeichnung UAA 170). Electromagnetic valves 40, 41 and 42 are placed after the driving transistors 39a, 39b and 39c. The regulating device 35 comprises a control housing 43 in which a control plunger 44 and a regulating plunger 45 are guided. Plungers 44 and 45 are solidly connected one to the other by a connecting rod 46. Above the regulating plunger 45 a compression spring 47, cooperating therewith, is arranged whereas below the regulating plunger 45, a pressure chamber 48 is formed in the control housing 43 and connected with the charging air control line 33. The control plunger 44 is provided with two circular grooves 49 and 50 which operatively cooperate, according to the position of the control plunger 44, on the one hand, with two radial bores 51 and 52 in the control housing 43. On the other hand, the grooves 49 and 50 are acting together with radial bores 53 and 54 in the control housing 43 as well as with radial bores 55, 56, 57 and 58 extending through the control housing 43 into the control plunger 44 whereby charging air is supplied to the bores 54, 57 and 58 via bore 52 and being connected to the pressure chambers 10 and 48 and charging air may be discharged into the atmosphere through bores 53, 55 and 56 at a corresponding position of the control plunger 44. These bores 53, 55 and 56 may be blocked in relation to the charging air control line 33 leading to the pressure chambers 10 and 48 by the electromagnetic valves 40, 41 and 42. 16 bores for the discharge of charging air are represented schematically by the three bores 53, 55 and 56 and 16 bores for the charging air supply are represented schematically by the three bores 54, 57 and 58. These bores are by themselves spiral-shaped throughout 360° circumferential area of the control plunger 44 and arranged in such a way that the imagined horizontal tangent of one bore intersects the next bore at a distance B. The 16 bores for the discharge of charging air are connected with bore 51 by means of a cylindrical recess 59 at the control housing 43 and the bores for the supply of charging air are connected with bore 52 by means of a cylindrical recess 60 in the control housing 43. Regarding the general functioning of the exhaust turbocharger and the valve 13, reference is made to the above description of FIG. 1.

After the internal combustion engine 1 has been started, charging air pressure arrives in the pressure chamber 11 of the control device 9 by way of the charging air control line 33, as well as through the bore 52 into the pressure chamber 10 of the control device 9 and into the pressure chamber 48 of the regulating device 35. After reaching a predetermined maximum air pressure of, for example, 2 atmospheres with a cold internal combustion engine 1, in response to which the compression spring 47 is compressed, the control plunger 44 and the regulating plunger 45 are moved in the direction of arrow A into a position in which the groove 49 covers the last of the 16 bores for the discharge of the charging air—as a matter of simplification, this bore is assumed to be 56 in FIG. 5—and in which groove 52 is correspondingly above the last of the 16 bores for the supply of charging air—bore 58 is assumed to be said last bore. By this action, the charging air pressure is limited to a maximum of 2 atmospheres.

After reaching a predetermined temperature of the internal combustion engine 1, the charging air pressure must be decreased. In dependence of the resistance 31, adjusting in accordance to the temperature of the cylinder head 30 of the internal combustion engine 1, the electromagnet-valve 42 is opened by way of the control electronic device 36 so that charging air is discharged into the atmosphere via bore 56, the cylindrical recess 59 and bore 51. The charging air pressure in the pressure chamber 10 and pressure chamber 48 decreases so that the valve 13, for the discharge of exhaust gas, is opened to the exhaust canal 15 and the control plunger 44 and the regulating plunger 45 are moved oppositely to the direction of arrow A (arrow A extends in an upward direction as viewed in the Figures) by the spring force of the compression spring 47. The discharge of the charging air and, therefore, the opening of valve 13 takes place, in the exemplified description, for such a time until the resistance 31, in accordance with the new temperature of the cylinder head 30, closes the electromagnetic valve 42. The electromagnetic valve 41 that follows is not opened as a result of the small assumed temperature change at the cylinder head 30. In this case, the control plunger 44 had moved so far in a direction opposite the direction of arrow A, that groove 51 covers the bore 55 which, in relation to the charging air pressure, is closed by the electromagnetic valve 41 and the groove 50 covering the bore 58. By this, the reduced air pressure is supplied to the pressure chambers 10 and 48 via bore 52, the cylindrical recess and bore 58 so that the regulating plunger 45 comes to rest and the valve 13 is again being closed. The charging pressure is, therefore, again adjusted to a new maximum charging air pressure below 2 atmospheres. With larger temperature changes (fluctuations) at the cylinder head 30, a movement of the control plunger 44 would take place over a number of bores for the discharge of the charging air whereby the electromagnetic valves, assigned to the individual bores, would be succesively opened and again closed. The alternating play between the bores for discharging charging air and the bores for the supply of charging air takes place also then as described.

When the internal combustion engine 1 is operated for a certain time at low loading, the temperature thereof decreases and the charging pressure can be increased. By means of the resistance 31, adjusted in dependence of the temperature of the cylinder head 30 of the internal combustion engine 1, the electromagnetic valve 42 which regulates flow through the bore 56 is again opened via the control-electronic device 36 starting from the before-mentioned control process. The increasing charging air pressure is delivered to the pressure chambers 10, 11 and 48 via the bore 52, cylindrical recess 60 and bore 58. Through the increasing pressure in the pressure chamber 48, the regulating plunger 45 as well as the control plunger 44 in moved in the direction of arrow A for such a time until the groove 50 covers the bore 58 only with distance B and charging air being discharged into the atmosphere through the open electromagnetic valve 42, the bore 56, the cylindrical recess 59 and bore 51. As a result of the increased temperature of the internal combustion engine as a result of the increased charging air pressure, the electromagnetic valve 42 is again closed through the resistance 31 and the electronic control device 30, so that the regulating device 35 again adjusts itself to the maximum charging air pressure of 2 atmospheres.

The inventive regulating device is not restricted to the use with supercharged internal combustion engines but it can be utilized everywhere where the pressure of an arbitrary medium is to be regulated.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Turbocharging apparatus including:
   an internal combustion engine,
   an exhaust gas driven turbocharger having an exhaust turbine and a charging air blower,
   an exhaust gas line leading to said exhaust turbine,
   a charging air line leading from said charging air blower to supply charging air to said engine,
   a bypass line which bypasses said exhaust turbine,
   control device means for controlling the proportion of exhaust gases conducted through said exhaust gas line and said bypass line,
   and regulating device means for regulating the control device means as a function of both the pressure in said charging air line and the temperature of an engine being supplied with charging air by said charging air line.

2. Apparatus according to claim 1, wherein said regulating device means includes means responsive to the temperature of a cylinder head of an engine being supplied with charging air by said charging air line.

3. Apparatus according to claim 1, wherein the regulating device means comprises a temperature dependent resistance and a servomotor controlled by the temperature dependent resistance, whereby the regulating device means is adjustable by changing of the maximum charging air pressure supplied to the engine.

4. Apparatus according to claim 3, wherein a difference-amplifier is operatively connected between the temperature dependent resistance and the servomotor and wherein a potentiometer responsive to the position of the regulating device is operatively connected in the control circuit with the temperature dependent resistance and the servomotor.

5. Apparatus according to claim 1, wherein said regulating device means includes an engine temperature dependent resistance and an electronic-control device placed after the temperature dependent resistance through which an adjustment of the regulating device by changing the maximum charging air pressure is controlled.

6. Apparatus according to claim 5, wherein said regulating device means includes electromagnetically operated valves controlled by said electronic-control device, said electromagnetically operated valves serving to control the flow of charging air through control lines of said regulating device.

7. Apparatus according to claim 6, wherein the electronic-control device comprises an integrated circuit through which a direct current voltage is digitalized in a predetermined number of steps with an opto-coupler and a driving transistor for each of said steps, said Opto-coupler being responsive to temperature changes of an engine, said driving transistors being operable to control the electromagnetically operated valves, which electromagnetically valves control the supply to and exhaust of charging air pressure to a control valve which directly controls an outlet connection between said bypass line and said exhaust gas line.

8. Apparatus according to claim 1, wherein said control device means includes a first housing defining a first housing space, a movable membrane separating said first housing space into respective first and second pressure chambers, and a valve member attached to and movable with said membrane in response to changing pressure conditions in said first and second pressure chambers, said valve member controlling an opening between said bypass line and said exhaust gas line,
   and wherein said regulating device means includes means for controlling the pressure in said first and second pressure chambers.

9. Apparatus according to claim 8, wherein said regulating device includes:
   second and third housings which are spaced respectively from each other and from said first housing, said second housing being disposed for movement with respect to said third housing,
   a regulating plunger slidably disposed in said third housing,
   and a control plunger slidably disposed in said second housing,
   wherein said regulating plunger and said control plunger are fixedly connected to one another for movement together,
   wherein said first pressure chamber is communicated with said charging air line by way of an opening through said second housing which is controlled by said control plunger, wherein said second pressure chamber is continuously in communication with said charging air line,
   and wherein the pressure communicated to said first pressure chamber is also communicated to a chamber in said third housing to control the position of said regulating plunger.

10. Apparatus according to claim 9, wherein said regulating device includes engine temperature responsive means for controlling the position of said second housing means as a function of engine temperature.

* * * * *